United States Patent Office 3,216,803
Patented Nov. 9, 1965

3,216,803
DIAGNOSTIC PROCEDURE
Ronald L. Searcy, Monterey Park, and Lois M. Bergquist, North Hollywood, Calif., assignors to Hyland Laboratories
No Drawing. Filed Aug. 23, 1962, Ser. No. 218,828
2 Claims. (Cl. 23—230)

This invention is concerned with a procedure for the quantitation of urea, particularly in biological fluids such as blood serum, plasma or urine. More particularly, this invention concerns a methodology for the direct quantitation of serum urea as a capillary column of precipitate.

The quantitation of urea in serum, plasma or urine has been accomplished by several techniques. In one such technique, serum, plasma or diluted urine is incubated with buffered urease for conversion of urea to ammonia. The ammonia is then measured by colorimetry which is based upon the reaction of the ammonia and reagents such as sodium phenate and hypochlorite to form a colored complex. The inensity of the color is proportional to the ammonia concentration.

Other techniques rely upon the observation that urea readily combines with xanthydrol to form an insoluble precipate, dixanthylurea, which can be estimated gravimetrically or colorimetrically. However, gravimetric procedures, which entail careful weighing of precipitates, are often too time consuming for most routine purposes. Colorimetric quantitation of dixanthylurea is complicated by the fact that both xanthydrol and dixanthylurea yield a yellow color in the presence of sulfuric acid, requiring removal of the xanthydrol by repeated washing of precipitates prior to colorimetry. To circumvent the limitations of the gravimetric and colorimetric procedures, turbidimetric quantitation of dixanthylurea was proposed. The turbidimetric procedure, however, requires equipment that is not routinely present in many laboratories where urea determination are conducted.

It is an object of this invention to provide a simplified technique for the determination of urea in biological fluids.

It is a further object to provide a methodology for serum urea quantitation that employs laboratory equipment that is routinely present in virtually all laboratories where urea determinations are conducted.

Other objects and advantages features will become apparent from the following detailed description and illustrative examples.

The instant inventive concept is based upon a technique whereby length of a column of centrifugally sedimented precipitate is measured in a microcappillary tube.

In the preferred practice of the present invention, a quantity of serum (one drop, about 128 microliters) delivered from a uniform-diameter capillary tube, is mixed with the appropriate volume (e.g., about 160 microliters) of an acidic substance (50% of acetic acid) on a glass slide. An amount of non-aqueous solution of xanthydrol sufficient to convert all of the urea to dixanthylurea (approximately 40 microliters of 10% xanthydrol in methanol) is added to the mixture and admixed therewith to assure a uniformity of suspension. An aliquot of the homogeneous suspension obtained thereby is drawn into a uniform-bore capillary tube to a height such that appropriately measurable amounts of dixanthylurea are present (60 millimeters, or so, being appropriate). After sealing, the tube is allowed to stand for a period of time sufficient to permit complete precipitation of the urea (a minimum of 15 minutes) before being centrifuged in a conventional microcapillary centrifuge for a standardized period of time (for example, 15 minutes in a table model microcapillary centrifuge). The column of sedimented precipitate is then directly measured, preferably to the nearset 0.1 millimeter.

The instant invention will be more clearly illustrated by reference to the following illustrative examples.

EXAMPLE I

*Standardization of the procedure*

Since xanthydrol is precipitated from methanol by water, an artificial standard urea solution could not be prepared. Therefore, serum collected from clinically healthy subjects as well as patients with moderate or severe azotemia was used to prepare 3 pools. Urea nitrogen determinations were performed on aliquots of the pools by direct nesslerization and by the modified Berthelot reaction as described in Clin. Chem. 8, 130 (1962). Dixanthylurea precipitates were prepared and measured by the following technique from uniform drops of the 3 pooled sera.

One drop of serum (28 microliters, delivered from a uniform-diameter capillary tube was mixed with four calibrated drops, 160 microliters, of 50% acetic acid on a glass slide. A single drop, 40 microliters, of 10% xanthydrol in methanol was added to the mixture and uniformity obtained with an applicator stick. Homogeneous suspensions were drawn into capillary tubes, were allowed to stand for 15 minutes and were then centrifuged in an International Microcapillary Centrifuge (Model MB) for 15 minutes. Columns of sedimented precipitate were measured to the nearest 0.1 millimeter using a millimeter rule and with the magnifying aid of a stand magnifier.

Using these procedures, a linear relationship is obtained between increasing concentration of urea nitrogen (from 11 to 180 milligrams per 100 milliliters of pooled sera) and column of precipitate. In most clinical laboratories a majority of sera exhibit concentrations of urea which fall within this range. Thus a satisfactory standard curve can be prepared by using sera of high as well as low urea content.

EXAMPLE II

*Reproducibility of dixanthylurea measurements*

A series of six sera containing normal and elevated amounts of urea were treated with xanthydrol by the method of this invention as set fourth in Example I. Duplicate levels of precipitate were in close agreement and exhibited a standard deviation of the means difference of ±0.15 millimeter, the results being shown in the following table.

| Specimen | Microcapillary Columns of Precipitate | |
|---|---|---|
| | (Mm.) | (Mm.) |
| 1 | 13.0 | 13.2 |
| 2 | 1.5 | 1.5 |
| 3 | 4.2 | 4.2 |
| 4 | 15.3 | 15.0 |
| 5 | 1.3 | 1.2 |
| 6 | 3.6 | 3.6 |

The modified Berthelot reaction when employed in analysis of the same serum specimens yielded a standard deviation of the mean difference of ±2.7 milligrams of urea per 100 milliliters of serum. Therefore, the precipitation technique of this invention provides precision comparable to that obtained with conventional techniques for the colorimetric measurement of urea nitrogen (through the application of the example set forth in Example III which follows).

EXAMPLE III

*Comparison of direct and indirect estimations of serum urea*

By convention, serum urea is reported as milligrams of urea nitrogen per 100 milliliters of serum. This means of reporting reflects the measurements obtained by the use of conventional, indirect techniques such as the modified Berthelot reaction. Therefore, it was deemed desirable to devise a technique for converting the millimeters of dixanthylurea obtained in the practice of the instant invention to milligrams of urea nitrogen per 100 milliliters of serum.

Blood was collected from 100 hospital patients with normal as well as elevated amounts of serum urea. Measurements of dixanthylurea precipitates were compared with colorimetric quantitation of serum urea nitrogen by the modified Berthelot reaction. Precipitate and urea nitrogen levels ranged from 1.0 to 14.0 millimeters and from 6 to 177 milligrams per 100 milliliters, respectively. Values good statistical correlation at the serum urea concentrations studied. From these data the following equation was derived from a line of best fit.

Mg. urea nitrogen per 100 ml. serum=13.5 (mm. dixanthylurea)−5.1

This equation permits the conversion of capillary columns of dixanthylurea, in capillary tubes having an internal bore diameter of from 0.0339 to 0.0377 inch, into urea nitrogen concentrations with a degree of accuracy satisfactory for clinical purposes.

It will be understood that although the discussion in the above examples has been restricted for illustrative purposes, to specimens of blood serum, the scope of the invention is not intended to be so restricted. Employing the procedures of this invention, urea can be quantitated in a variety of specimens, including water and biological fluids such as serum, plasma and urine.

What we claim is:
1. In a method for the quantitation of urea in a specimen, the steps of:
   (a) Mixing a measured amount of specimen under acidic conditions with a measured amount of a non-aqueous solution of xanthydrol sufficient to convert all of the urea to a precipitate of dixanthylurea in homogeneous suspension;
   (b) Drawing into a uniform-bore capillary tube an aliquot of the homogeneous suspension sufficient to provide an amount of dixanthylurea which, after centrifugation, is measurable to 0.1 millimeter and, thereafter, sealing the capillary tube;
   (c) At a time subsequent to about 15 minutes from the performance of the mixing operation of step (a), subjecting the sealed, uniform-bore capillary tube and its contents to centrifugation to thereby form a uniform volume, packed precipitate of dixanthylurea; and
   (d) Measuring the length of the column of packed precipitate and relating the measurement thus obtained to the quantity of urea present in the specimen by comparison with a standard.

2. The method of claim 1 in which the non-aqueous solution of xanthydrol in step (a) is a methanolic solution of xanthydrol.

References Cited by the Examiner
UNITED STATES PATENTS

| | | | |
|---|---|---|---|
| 2,198,256 | 4/40 | Levy | 233—26 |
| 2,885,145 | 5/59 | Danielsson et al. | 233—26 |
| 2,908,160 | 10/59 | Danielsson | 73—61 |
| 3,068,071 | 12/62 | Velluz et al. | |

OTHER REFERENCES

Engel et al.: Journal of Biological Chemistry, vol. 167, pages 535–541 (February, 1947).

Lee et al.: Biochemical Journal, vol. 31, part 2, pages 2035–2045 (1937).

MORRIS O. WOLK, *Primary Examiner.*